(12) United States Patent
Wiedenhoefer

(10) Patent No.: US 12,741,309 B2
(45) Date of Patent: Sep. 22, 2026

(54) INTERLOCKING PLATE HEAT EXCHANGER

(71) Applicant: Raytheon Technologies Corporation, Farmington, CT (US)

(72) Inventor: James F. Wiedenhoefer, Windsor, CT (US)

(73) Assignee: RTX Corporation, Farmington, CT (US)

(*) Notice: Subject to any disclaimer, the term of this patent is extended or adjusted under 35 U.S.C. 154(b) by 362 days.

(21) Appl. No.: 18/107,266

(22) Filed: Feb. 8, 2023

(65) Prior Publication Data

US 2024/0261846 A1 Aug. 8, 2024

(51) Int. Cl.

| | |
|---|---|
| ***B21D 53/04*** | (2006.01) |
| ***B23P 15/26*** | (2006.01) |
| ***F28D 9/00*** | (2006.01) |
| ***F28F 3/04*** | (2006.01) |
| ***F28F 3/08*** | (2006.01) |
| ***F28F 13/12*** | (2006.01) |

(52) U.S. Cl.

CPC .............. *B21D 53/04* (2013.01); *B23P 15/26* (2013.01); *F28D 9/0062* (2013.01); *F28F 3/048* (2013.01); *F28F 3/08* (2013.01); *F28F 13/12* (2013.01); *F28D 9/0037* (2013.01); *F28F 2255/00* (2013.01)

(58) Field of Classification Search

CPC .......... B21D 53/02; B21D 53/04; B23P 15/16

See application file for complete search history.

(56) References Cited

U.S. PATENT DOCUMENTS

| | | | |
|---|---|---|---|
| 1,662,870 | A | 3/1928 | Stancliffe |
| 3,732,921 | A | 5/1973 | Hilicki et al. |
| 4,420,039 | A | 12/1983 | Dubrovsky |

(Continued)

FOREIGN PATENT DOCUMENTS

| | | | | |
|---|---|---|---|---|
| CN | 110425915 A | | 11/2019 | |
| CZ | 383696 A3 | * | 12/1997 | .............. F28F 3/048 |

(Continued)

OTHER PUBLICATIONS

English Machine Translation of CZ-383696-A3 (Year: 1997).*

(Continued)

*Primary Examiner* — Sarang Afzali

(74) *Attorney, Agent, or Firm* — Bachman & LaPointe, P.C.

(57) ABSTRACT

A method for making a heat exchanger includes machining a plate of material having a starting thickness and at least one alignment feature. The machining includes machining down the starting thickness to produce a heat exchanger plate having at least one flow passage segment and at least two ribs arranged extending along each side of the at least one flow segment. The at least one alignment feature is removed to provide a trimmed heat exchanger plate and to stack the trimmed heat exchanger plate with a further heat exchanger plate. The at least two ribs are interlocked with ribs of the further heat exchanger plate and the at least one flow segment is aligned with a flow segment of the further heat exchanger plate. The at least two ribs of the trimmed heat exchanger plate and the ribs of the further heat exchanger plate are joined together.

15 Claims, 5 Drawing Sheets

(56) References Cited

U.S. PATENT DOCUMENTS

| | | | |
|---|---|---|---|
| 4,505,419 A | 3/1985 | Steeb | |
| 4,791,982 A | 12/1988 | Meyerhofer | |
| 4,804,041 A | 2/1989 | Hasegawa et al. | |
| 5,107,922 A | 4/1992 | So | |
| 5,844,333 A | 12/1998 | Sheerin | |
| 5,849,393 A | 12/1998 | Slattery | |
| 6,213,158 B1 | 4/2001 | Rhodes et al. | |
| 6,273,183 B1 | 8/2001 | So et al. | |
| 6,536,513 B1 | 3/2003 | Font-Freide et al. | |
| 6,546,774 B2 | 4/2003 | Granetzke | |
| 6,634,421 B2 * | 10/2003 | Ognibene | H01L 23/473 257/E23.098 |
| 6,953,081 B2 | 10/2005 | Klingler et al. | |
| 7,428,374 B2 | 9/2008 | Franke et al. | |
| 7,441,331 B2 * | 10/2008 | Hudson | F01D 5/187 29/469 |
| 9,903,669 B2 | 2/2018 | Ishimaru et al. | |
| 10,202,880 B2 | 2/2019 | Kuroyanagi et al. | |
| 10,392,952 B2 | 8/2019 | Zaccardi et al. | |
| 10,544,991 B2 | 1/2020 | Hill et al. | |
| 10,782,071 B2 | 9/2020 | Cerny et al. | |
| 11,118,838 B2 | 9/2021 | Joseph et al. | |
| 11,454,448 B2 | 9/2022 | Fukada et al. | |
| 2001/0011586 A1 | 8/2001 | Yamaguchi et al. | |
| 2009/0084129 A1 | 4/2009 | Kim et al. | |
| 2012/0006524 A1 | 1/2012 | Jensen et al. | |
| 2012/0145364 A1 | 6/2012 | Oritani et al. | |
| 2015/0041590 A1 * | 2/2015 | Kirtley | F01D 5/28 244/123.1 |
| 2017/0157723 A1 | 6/2017 | Moro-Le-Gall et al. | |
| 2017/0356691 A1 | 12/2017 | Willis et al. | |
| 2019/0041140 A1 | 2/2019 | Traore et al. | |
| 2019/0086160 A1 | 3/2019 | Lu et al. | |
| 2020/0370834 A1 | 11/2020 | Fukada et al. | |
| 2022/0011053 A1 | 1/2022 | Takahashi et al. | |
| 2022/0214114 A1 | 7/2022 | Wan et al. | |
| 2022/0228818 A1 | 7/2022 | Yatsuyanagi et al. | |

FOREIGN PATENT DOCUMENTS

| | | |
|---|---|---|
| DE | 202008013351 U1 | 3/2010 |
| JP | H03279793 A | 12/1991 |
| JP | H11311488 A | 11/1999 |
| JP | 2001065801 A | 3/2001 |
| JP | 2014145502 A | 8/2014 |
| WO | 2005080018 A1 | 9/2005 |

OTHER PUBLICATIONS

European Search Report Dated Jun. 24, 2024 issued in corresponding application 24156502.7.

European Office Action dated Jul. 11, 2025, issued in corresponding application 24156502.7.

Sofia G Mavridou et al: "Numerical evaluation of a heat exchanger with inline tubes of different size for reduced fouling rates", International Journal of Heat and Mass Transfer, Elsevier, Amsterdam, NL, vol. 55, No. 19, Apr. 30, 2012, pp. 5185-5195, XP028399949, ISSN: 0017-9310, DOI: 10.1016/J.IJHEATMASSTRANSFER.2012.05.020.

Lam Ket Al: "Experimental study and large eddy simulation of turbulent flow around tube bundles composed of wavy and circular cylinders", International Journal of Heat and Fluid Flow, Butterworth Scientific Ltd, Guildford, GB, vol. 31, No. 1, Feb. 1, 2010, pp. 32-44, XP026853202, ISSN: 0142-727X.

* cited by examiner 18
19
19

32
34
19
24'
24
20
32
34
24'
22
36
19
34
30
28
30
26
36
24
20
24

18
30'
26
28
30
30
30'
32
32
22

32
24'
26
24
22
20
24'
18
32

38
48
46

18
32
19
26
24'
24
20
42
40
22

20
44
36

INTERLOCKING PLATE HEAT EXCHANGER

BACKGROUND OF THE DISCLOSURE

This disclosure relates to heat exchangers and, more particularly, to a heat exchanger having an interlocking structure and a method for making same.

Casting is frequently used for making components of heat exchangers. The components, for example heat exchange plates, are typically designed or created via investment casting of a 'hot plate' containing a ceramic core. The core is leached out, and this process is followed to produce multiple plates that are stacked and bonded together to create the final assembly.

Much time is required to produce tooling for both the ceramic core and the wax molds, thus making this process time consuming, and also expensive.

Further, casting can result in heat exchanger components that are larger than might be desired. This larger size is needed in order to successfully cast the part, but leads to a heat exchanger that is heavier than is desired. This extra size can be problematic, for example in aerospace applications where space and weight are both sensitive parameters.

SUMMARY OF THE DISCLOSURE

The present disclosure relates to a heat exchanger, and method for making same, wherein plates are machined to a desired shape which allows the heat exchanger components to have smaller dimensions and finer details, and also saves time and cost in the manufacture.

In one non-limiting configuration, a method for making a heat exchanger, comprises machining a plate of material having a starting thickness and at least one alignment feature, the machining comprising machining down the starting thickness to produce a heat exchanger plate having at least one flow passage segment, and at least two ribs arranged extending along each side of the at least one flow segment; removing the at least one alignment feature to provide a trimmed heat exchanger plate; stacking the trimmed heat exchanger plate with a further heat exchanger plate with the at least two ribs interlocked with ribs of the further heat exchanger plate, and the at least one flow segment aligned with a flow segment of the further heat exchanger plate; and joining the at least two ribs of the trimmed heat exchanger plate and the ribs of the further heat exchanger plate together.

In a further non-limiting configuration, the joining step comprises a diffusion bonding step.

In another non-limiting configuration, the method further comprises applying braze to at least one of the at least two ribs of the trimmed heat exchanger plate and the ribs of the further heat exchanger plate.

In still another non-limiting configuration, the method further comprises machining the at least two ribs to have the interlocking structure.

In another non-limiting configuration, the interlocking structure is selected from the group consisting of a convex upward facing surface, a concave upward facing surface, or a combination of a convex upward facing surface and a concave upward facing surface.

In a further non-limiting configuration, the further heat exchanger plate has ribs that match the at least two ribs such that a convex surface is paired with a concave surface of the at least two ribs, and a concave surface is paired with a convex surface of the at least two ribs.

In a still further non-limiting configuration, the machining comprises wire-EDM machining.

In another non-limiting configuration, the machining defines a plurality of machined flow passage segments extending along and defining a flow direction of the heat exchanger plate, and the at least two ribs comprise a plurality of ribs defined one on each side of each of the plurality of machined flow passage segments.

In still another non-limiting configuration, the method further comprises machining turbulator structures into a surface of the at least one flow passage segment.

In a further non-limiting configuration, the step of further machining turbulator structures comprises plunge-EDM machining of the turbulator structures.

In a still further non-limiting configuration, the method further comprises machining each side of the plate of material to produce a heat exchanger plate having the at least one flow passage segment and at least two ribs on each side of the heat exchanger plate.

In another non-limiting configuration, the machining step produces the heat exchanger plate having the at least one flow passage segment and at least two ribs, and excess material extending in at least one dimension beyond the at least one flow passage segment and the at least two ribs, and the step of removing the at least one alignment feature comprises removing the excess material.

In still another non-limiting configuration, the alignment feature comprises a hole passing through the excess material.

In a further non-limiting configuration, the machining defines the heat exchanger plate having a parting plate thickness defined between opposed surfaces of the plate of between 0.005 and 0.020 inches.

In a still further non-limiting configuration, the machining defines the heat exchanger having the at least two ribs having a thickness of between 0.005 and 0.020 inches.

In another non-limiting configuration, the method further comprises machining receiver pockets into the at least one flow path segment, and positioning a folded fin pack in the at least one flow path segment, the folded fin pack having fin bends that are positioned in the receiver pockets, whereby the joining step joins the bends of the folded fin pack to the receiver pockets.

In still another non-limiting configuration, the machining comprises machining both sides of a plurality of plates to produce a plurality of heat exchanger plates having the at least one flow passage segment and the at least two ribs on a first side, and having a second at least one flow passage segment and at least two ribs on a second side.

In a further non-limiting configuration, the first at least one flow passage segment has different dimensions as compared to the second at least one flow passage segment.

In a still further non-limiting configuration, the stacking step comprises stacking the plurality of heat exchanger plates with the first side of one heat exchanger plate facing the first side of an adjacent heat exchanger plate, and with the second side of the one heat exchanger plate facing the second side of another adjacent heat exchanger plate.

In another non-limiting configuration, the at least one flow passage segment on the first side is substantially perpendicular to the at least one flow passage on the second side.

In a further non-limiting embodiment, a method for making a heat exchanger comprises machining a plate of material having a starting thickness, the machining comprising machining down the starting thickness on both sides of the plate to produce a heat exchanger plate having a first side having at least one flow passage segment, and at least two ribs arranged extending along each side of the at least one flow segment, and having a second side having at least one second flow passage segment, and at least two ribs arranged extending along each side of the at least one second flow segment; stacking the heat exchanger plate with a further heat exchanger plate with the at least two ribs interlocked with ribs of the further heat exchanger plate, and the at least one flow segment aligned with a flow segment of the further heat exchanger plate; and joining the at least two ribs of the trimmed heat exchanger plate and the ribs of the further heat exchanger plate together.

In another non-limiting embodiment, a heat exchanger comprises a plurality of parting plates bonded together in layers, wherein each parting plate of the plurality of parting plates has opposed surfaces each defining a portion of a heat exchange flow passage, and wherein each parting plate has a thickness defined between opposing surfaces of the parting plates of between 0.005 and 0.020 inches.

The foregoing features and elements may be combined in various combinations without exclusivity, unless expressly indicated otherwise. These features and elements as well as the operation thereof will become more apparent in light of the following description and the accompanying drawings. It should be appreciated that the following description and drawings are intended to be exemplary in nature and non-limiting.

BRIEF DESCRIPTION OF THE DRAWINGS

A detailed description of non-limiting embodiments of the present disclosure follows, with reference to the attached drawings, wherein.

DETAILED DESCRIPTION

Figure 1:
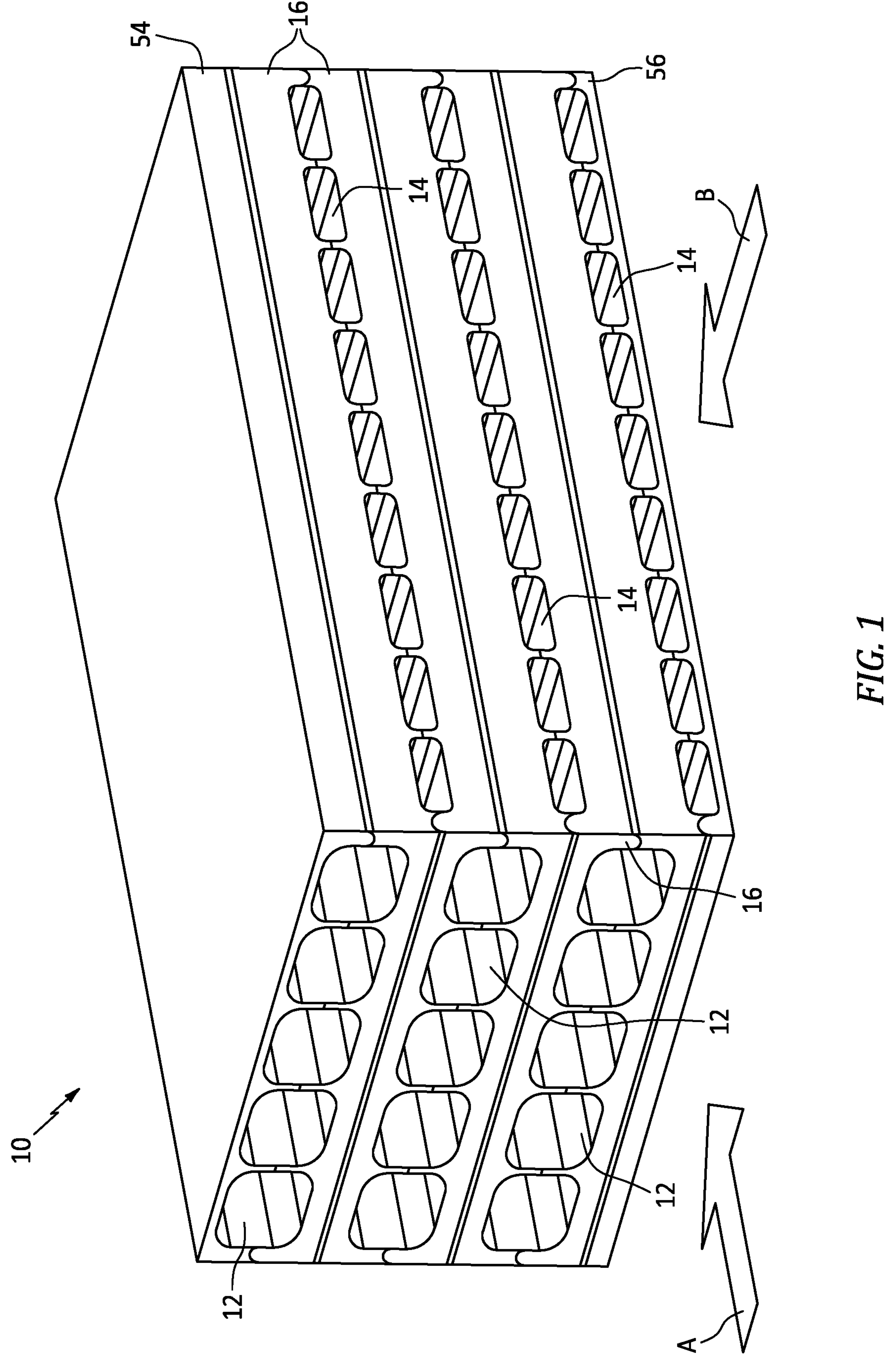
FIG. 1 shows one configuration of an interlocking plate heat exchanger as disclosed herein.

The disclosure relates to heat exchangers and a method for making same. FIG. 1 illustrates a heat exchanger 10 according to one non-limiting configuration of this disclosure.

Heat exchanger 10 has a plurality of flow passages 12 defining one flow direction A for a first heat exchange fluid, and a second plurality of flow passages 14 defining a second flow direction B for a second heat exchange fluid. Flow passages 12, 14 are defined by flow passage segments on opposite sides of a plurality of stacked heat exchanger plates 16 as will be further described below.

In one configuration, a method is disclosed for making heat exchanger plates and ultimately the heat exchanger as shown in FIG. 1. The heat exchanger plates are produced by machining to the desired structures, which is an improvement in both time and cost as compared to casting which is typically used to manufacture heat exchanger plates. Specifically, by machining the plates, it is possible to quickly produce plates with dimensions, for example plate thickness, that is smaller than can be produced using conventional casting techniques.

Figures 2, 3, 4, 5:
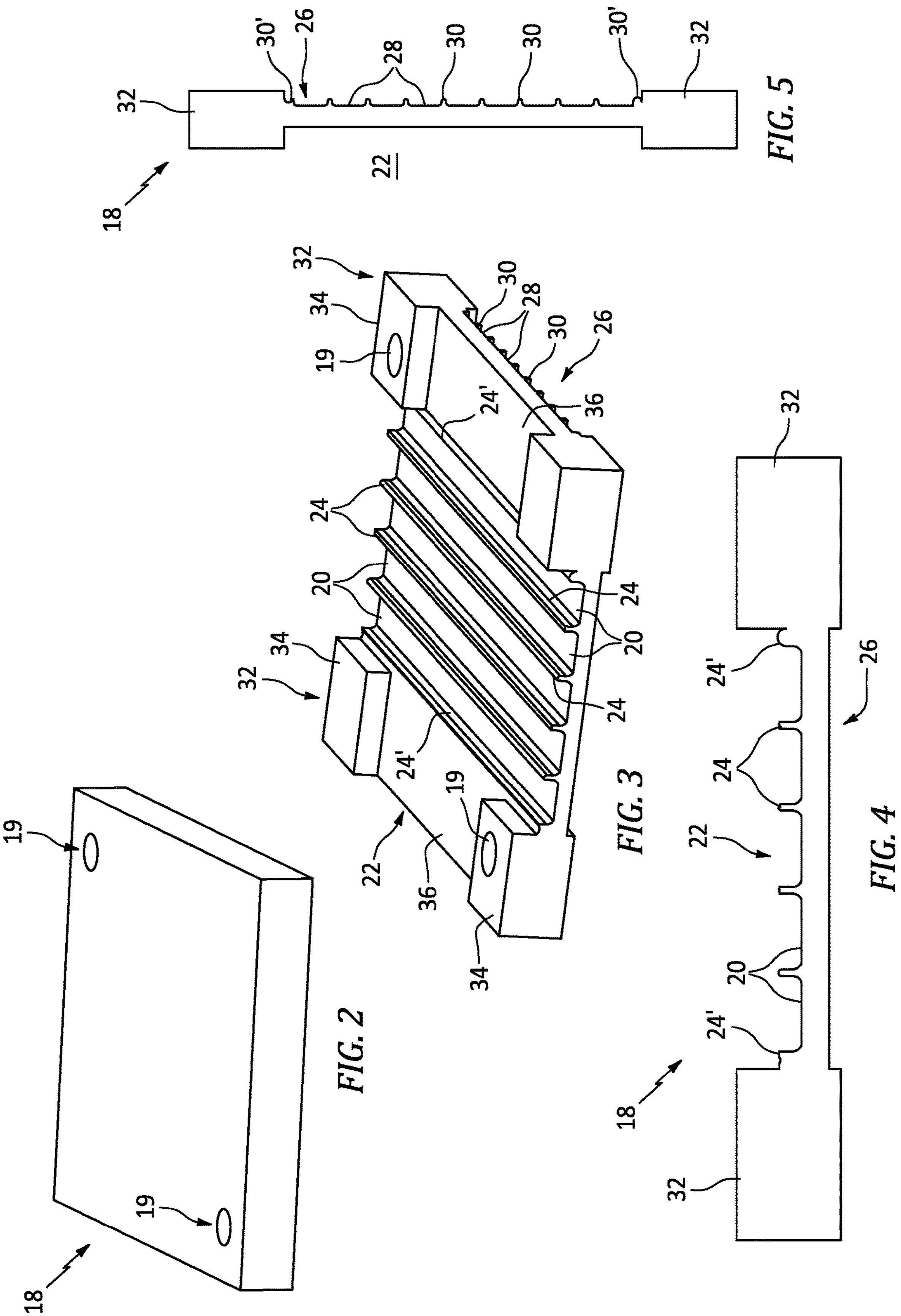
FIG. 2 illustrates a starting plate for machining a plate for a heat exchanger as illustrated in FIG. 1.
FIG. 3 is a perspective view showing a plate after a first machining step as disclosed herein.
FIG. 4 is a side view of the plate of FIG. 3 showing flow passage segments and ribs along one side of the plate.
FIG. 5 is a rotated side view of the plate of FIG. 3 showing flow passage segments and ribs along the other side of the plate.

FIG. 2 shows a starting plate 18 of suitable material that can have a starting thickness sufficient to accommodate the maximum desired thickness of the finished plate. Further, starting plate 18 can have one or more alignment features 19, which can be a simple hole passing through the plate as shown, or any other feature that can be used to align the plate with precision for later machining steps. In the illustrated plate 18, alignment features 19 are positioned along side edges of plate 18 as these edges of the plate are wider than the intended finished product, and thus the alignment features are located in a place that does not interfere with the end product.

Plate 18 can be fabricated from any suitable material examples of which include but are not limited to stainless steel, austenitic nickel-chromium-based superalloys such as Inconel and other nickel-based super alloys and the like. Further, the thickness of plate 18 can suitably be at least as thick as the final intended part. Thus, for a plate 16 (FIG. 1) that will have a thickness of about 0.010 inches, starting plate 18 can have a thickness of about 0.300 inches to allow the desired features to be machined into the plate. In one non-limiting configuration, the starting thickness of plate 18 can be based on several parameters, for example parting thickness, ½ height of passage 12, and ½ height of passage 14. Further, as will be discussed below, when flow passages are machined into plate 18, they are typically machined into both sides of the plate so that a plurality of plates can be stacked to define a multi-layer heat exchanger. The thickness defined herein relates to a thickness between the machined surfaces on both sides of the plate, that is, the narrowest thickness of the plate between machined structures on both of the opposed flat surfaces of the plate.

Plate 18 can be machined, for example using electrical discharge machining or EDM, to remove material and thereby create a first plurality of flow passage segments 20 extending along a first side 22 of plate 18. First flow passage segments 20 are separated by a first plurality of ribs 24 running along segments 20. In the configuration of FIG. 3, five (5) parallel flow passage segments 20 are machined into side 22, separated by four (4) internal ribs 24 and having outer edges defined along thicker ribs 24' in the form of blocker bars to close off the sides of the flow passage of the heat exchanger. These ribs 24' can be thicker as they have greater stress imposed upon them during manufacture and use of the heat exchanger.

Opposing sides of each plate can be machined to provide the desired flow passage segments, and a plate or parting plate thickness can be defined between opposed surfaces of plate 18 which, due to the machining and sintering or brazing steps disclosed herein, can be thinner than can conventionally be accomplished, for example using casting. Plates 18 can advantageously be machined to provide a parting plate thickness of between about 0.005 and about 0.020 inches.

Internal ribs 24 can have a rib thickness, or width between opposite sides of the rib, of between 0.005 and 0.020 inches. This is a thinner feature than can be accomplished with casting, and is helpful in producing a heat exchanger that is smaller and/or lighter than was previously possible. External or blocker bar ribs 24' can be provided having a greater thickness to provide additional structural integrity to the heat exchanger, and to help the resulting heat exchanger be more robust during assembly and use. Thus, these ribs 24' can be configured to be thicker or wider than internal ribs 24.

The other side or second side 26 of plate 18 can also be machined to produce a second plurality flow passage segments 28 separated by a second plurality of ribs 30 including thicker ribs 30' in the form of blocker bars along sides of the second plurality of flow passage segments 28. As shown, in order to produce the cross-flow heat exchanger configuration as shown in FIG. 1, first flow passages 20 can be aligned substantially perpendicular to second flow passages 28. Also, the first flow passages 20 and second flow passages 28 can have the same or different dimensions, including different width, height or both. The machining of sides 22, 26 can be done simultaneously or sequentially depending upon the machining equipment and process, and again the alignment features 19 can be used to ensure proper and precise positioning of plate 18 during machining.

In this regard, alignment features in one configuration are intended to be removed during the manufacturing process, and therefore these features 19 can be provided in excess material 32, for example in side areas of plate 18 wherein plate 18 is initially sized with excess material beyond the intended width of passage segments 20 and ribs 24, 24' (or passage segments 28 and ribs 30. 30' on the second side 26). FIG. 3 shows excess material 32 including corner squares 34 that are left at original height and central sections 36 of excess material 32 that are machined closer to the same height as ribs 24.

With respect to alignment features 19, it should be appreciated that other structures or methods could be used by persons skilled in the art to assist in accurate machining of the plates. Nevertheless, the disclosed use of alignment features that are on excess plate material that is removed before the plates are stacked is one particularly well suited non-limiting configuration.

FIG. 4 shows a side view of plate 18 after the initial machining step and further illustrates flow passage segments 20 between ribs 24. Because flow passage segments 28 are substantially perpendicular to segments 20, they cannot be seen in the view of FIG. 4.

FIG. 5 shows a rotated side view of the plate 18 of FIG. 3 wherein flow passage segments 28 and ribs 30 can be seen. In the non-limiting configuration of FIGS. 3-5, flow passage segments 20 are wider and greater in height than flow passage segments 28.

Figures 6, 7, 8, 9:
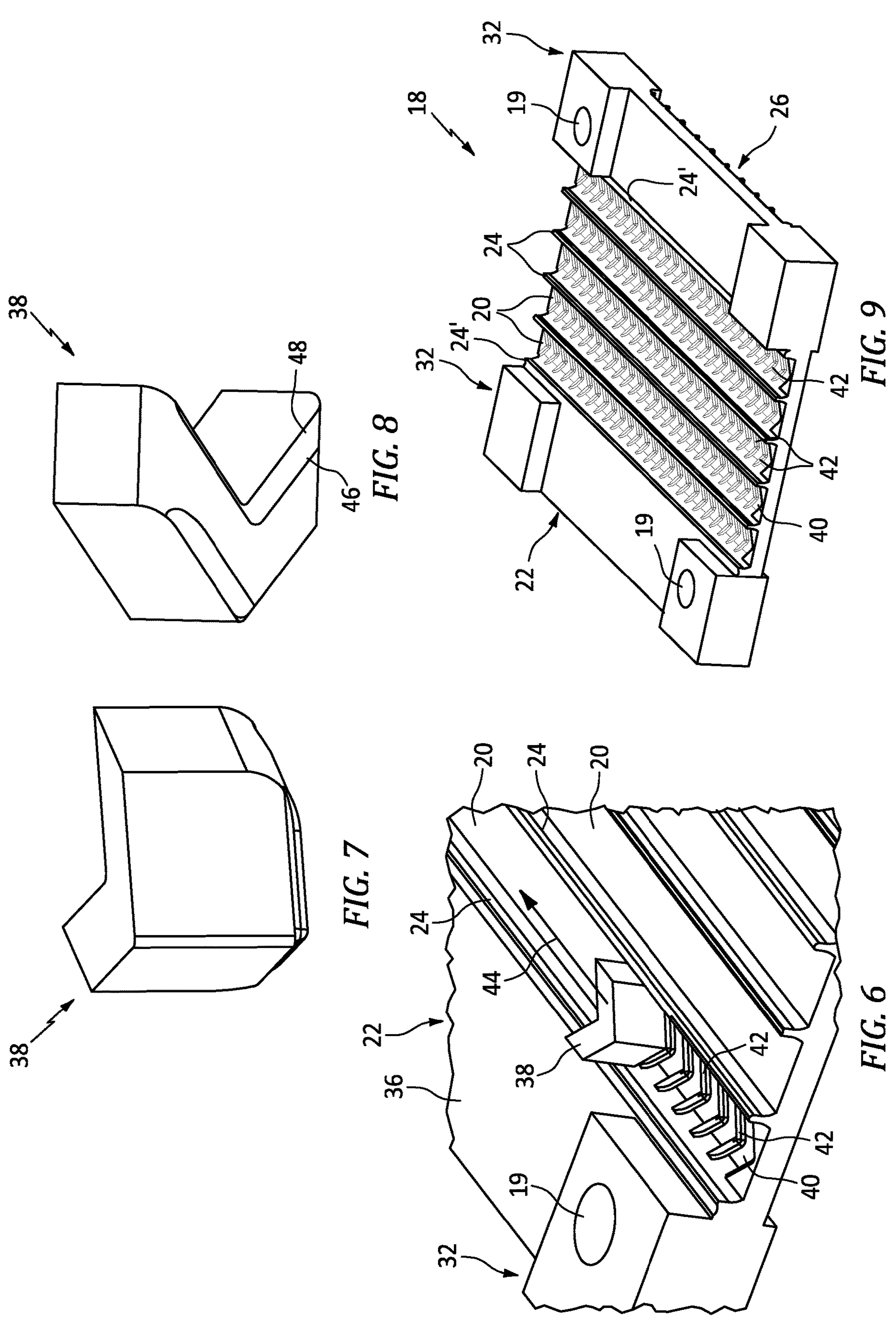
FIG. 6 illustrates a plunge EDM process for introducing turbulator structures to a flow passage segment of the plate of FIG. 3.
FIGS. 7 and 8 illustrate a plunge EDM tool useful for the step of FIG. 6.
FIG. 9 illustrates the plate of FIG. 3 with turbulators machined into each of the flow passage segments of one side of the plate.

In a heat exchanger that will have separate flow passages 12, 14, such as is shown in FIG. 1, turbulators are frequently utilized to improve flow characteristics through the flow passages. Referring now to FIG. 6, such turbulators can be formed in passage segments 20 using plunge EDM, by applying a plunge EDM tool 38 which, in this example, has a chevron shape that is imparted to the turbulators. As shown in FIG. 6, plunge EDM tool 38 removes a portion of material from a flow surface 40 of flow passage segments 20 to define raised chevron ridges 42 along flow passage segments 30.

FIGS. 7 and 8 show further detail of a suitable plunge EDM tool 36 which is shaped to remove material in sequential positions along flow passage segments 30 as schematically illustrated by arrow 44. As best seen in FIG. 8, a bottom surface of plunge EDM tool can have rounded edges 46 leading to an upwardly offset shoulder 48 that serves to define chevron ridges 42 as turbulators as desired. It should of course be appreciated that turbulators can have other shapes, and when this is desired, a different EDM plunge tool would be used to form the desired turbulator shape.

FIG. 9 shows plate 18 with turbulators in the form of chevron ridges 42 machined into flow surface 40 of each flow passage segment 20 as desired.

Figures 10, 11, 12, 13:
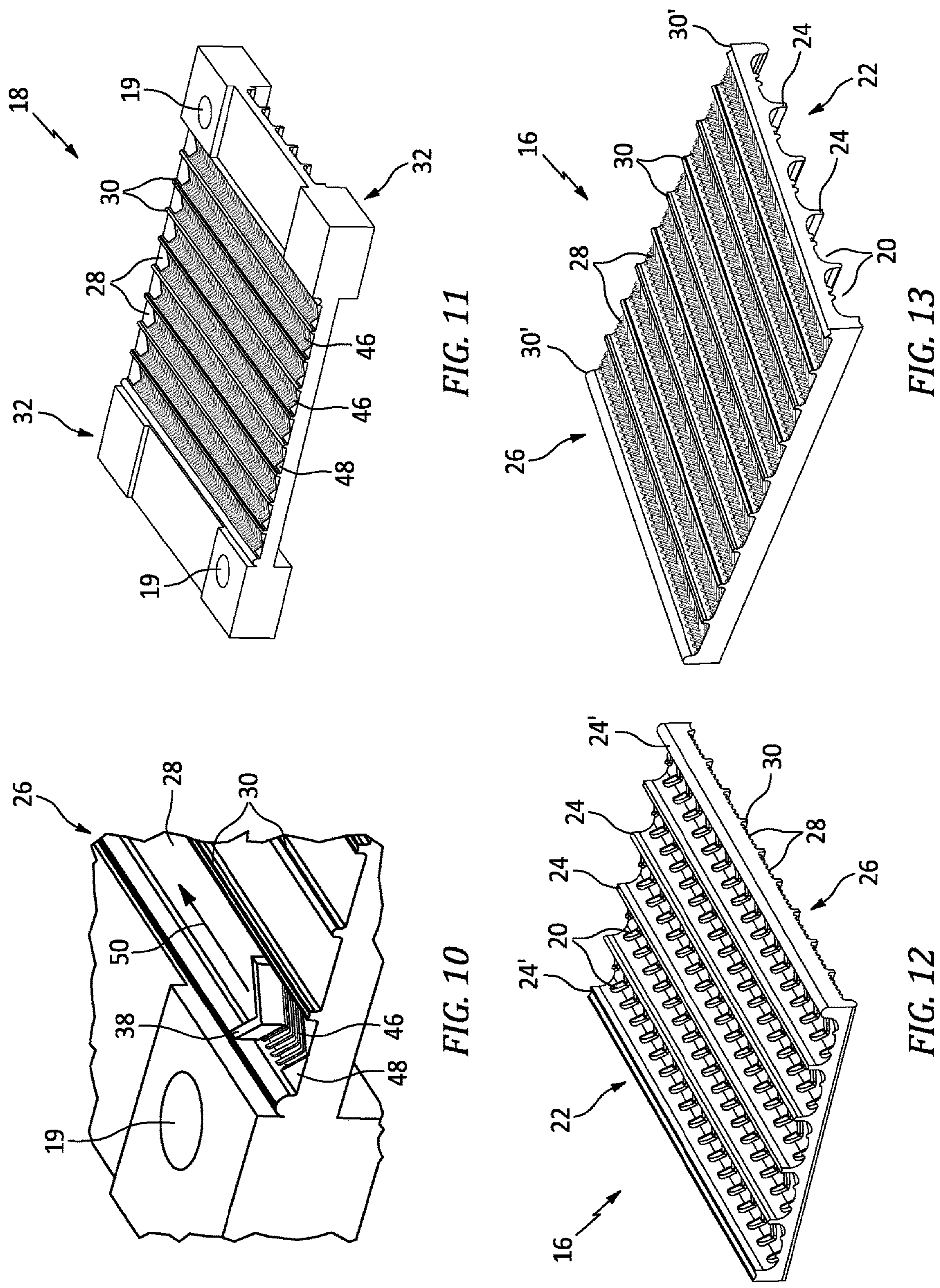
FIG. 10 illustrates a plunge EDM process for introducing turbulators to the other side of the plate of FIG. 3.
FIG. 11 illustrates a reverse side of the plate of FIG. 3 with turbulators machined into each of the flow passage segments of this side of the plate.
FIGS. 12 and 13 illustrate perspective side views of a plate having turbulators of different size on opposite sides of the plate, and with excess portions and alignment features removed.

Referring now to FIG. 10, second side 26 of plate 18 can also be treated with a plunge EDM tool 38 to form turbulators in the shape of chevron ridges 46 on flow surface 48 of flow passage segments 28. As with machining the first surface, EDM tool 38 can be applied in spaced positions along each flow passage segment 28 for example along the direction shown at arrow 50. EDM tool 38 for this machining step can be of a different size from the tool used on the first side 22, such that the chevron ridges 46 can have a different height and/or spacing than those on the first side. FIG. 11 shows this process completed, with chevron ridges 46 defined along the flow surface 48 of each flow segment 28.

In the next step, plate 18 can be trimmed to remove excess material 32, leaving a final heat exchanger plate 16 (FIGS. 12 and 13) as desired and as is used in the heat exchanger of FIG. 1.

Heat exchanger plates 16 can then be stacked, in alternating orientation such that first sides 22 of adjacent plates face each other and segments 20 define first flow passages 12 (FIG. 1), and further such that second sides 26 of adjacent plates face each other and segments 28 define second flow passages 14.

Figures 14, 15, 16, 17:
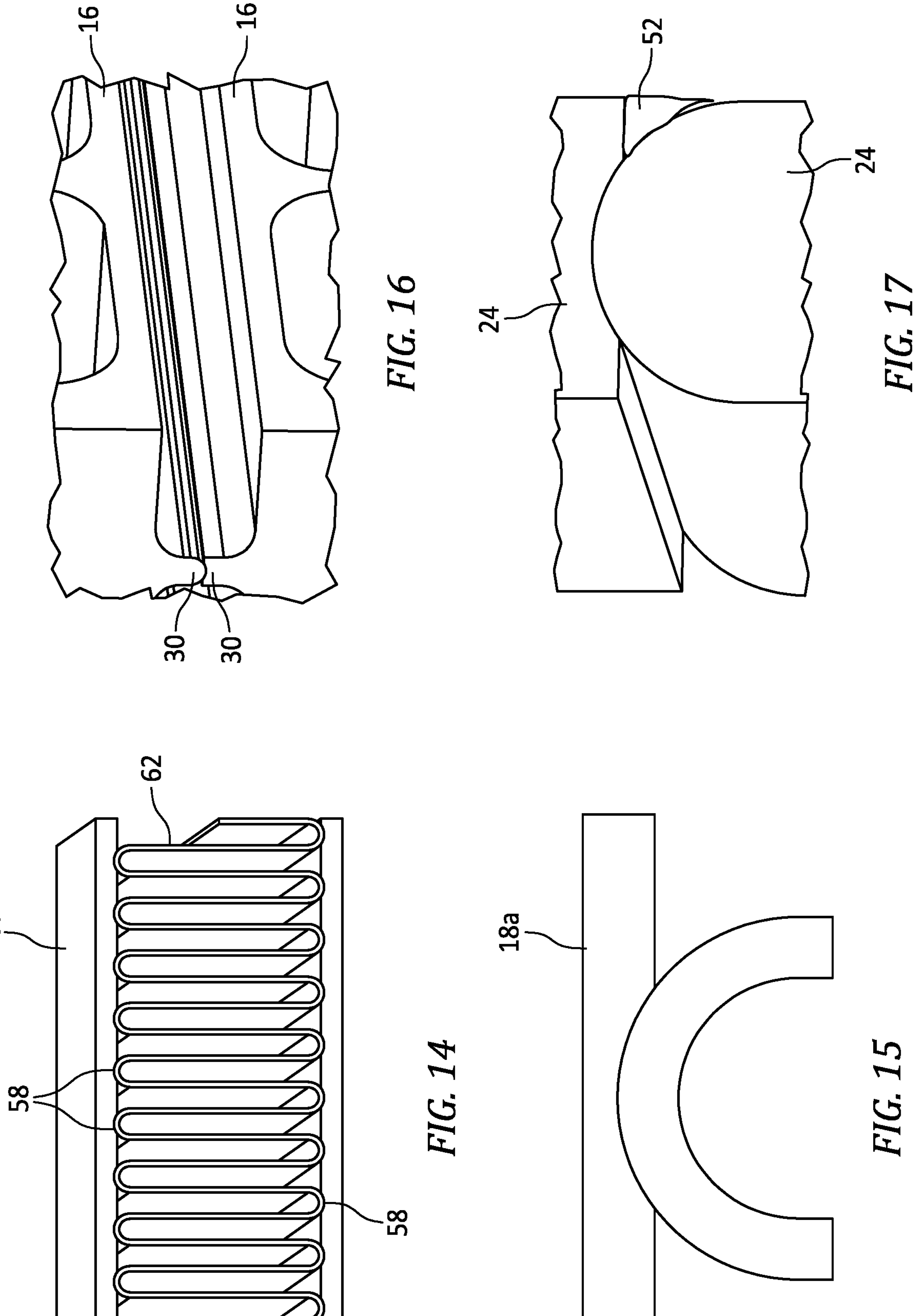
FIGS. 14 and 15 illustrate an alternative configuration wherein a fin pack is introduced between machined plates as disclosed herein, and showing a receiver pocket to receive rounded edges of the fin pack.
FIGS. 16 and 17 illustrate interlocking ribs joining adjacent plates as disclosed herein.

In this regard, it should be noted that ribs 24 24' and 30, 30', respectively, contact each other between adjacent plates, and these ribs are to be bonded together to make the final heat exchanger. To assist in this process, ribs 24, 24', 30, 30' are preferably machined with interlocking structure such that they readily interact with each other during stacking, and further such that they can be effectively and efficiently bonded together. In one configuration, ribs 24, 24' on first side 22 are machined having alternating convex and concave surfaces such that, when assembled together, a convex rib of one plate contacts a concave rib if an adjacent plate. This interlocking is illustrated in FIGS. 16 and 17. In FIG. 16, two plates 16 are interlocked at ribs 30, 30' and a cross section shows an upper plate 16 having a downwardly convex rib 30 that is convex facing the other plate 16, while the lower plate 16 has a concave rib 30 that is concave facing the other plate such that these structures readily interact and interlock with each other. In the configuration discussed, each plate 16 can have a combination of concave and convex ribs on each side, and can be made such that a single plate configuration can be machined to as many of a plurality of plates as are needed, and then stacked or assembled in alternating manner. Other combinations of concave and convex or other interlocking structures can be machined into ribs of plates as desired, and depending upon the selected structures and configurations, it may be necessary to machine more than one plate configuration in order to stack the plates as desired.

FIG. 17 shows a mirror image configuration wherein a lower rib 24 is convex and the upper rib 24 is concave. Further, FIG. 17 shows that a braze material 52 can be applied onto surfaces of ribs 24 (and also 30), and then during bonding, for example by Field Assisted Sintering Technology (FAST) or Spark Plasma Sintering (SPS) technique, ribs 24, 24' and ribs 30, 30' are firmly bonded together in their interlocking positions.

Referring back to FIG. 1, it should be appreciated that while most plates 16 are machined to define desired structures on both sides 22, 26, a top plate 54 and a bottom plate 56 can be machined with flow passage segments and ribs on only one side, and the outer facing side can be made flat, without features, or can be made with other features, for example features suitable to installation of the heat exchanger in a desired location.

The above disclosure is in terms of a heat exchanger using turbulators in defined flow passages. The present disclosure can also be utilized to manufacture heat exchangers that will use conventional fin packs. When this is to be the case, and referring to FIG. 14, a starting plate 18*a* can be initially fabricated of a desired thickness, and grooves 58 can be machined into a surface 60 of plate 18*a*. A conventional fin pack 62 can then be positioned between plates 18*a*, and once stacked to the desired number of levels, including side bars (not shown) to close off sides of fin pack 62, the plates 18*a* can be bonded in place, again using braze where plates 18*a* are joined to fin pack 62 and bonding using, as one non-limiting example, Field Assisted Sintering Technology (FAST). In this regard, and as shown in exploded view of FIG. 15, grooves 58 define receiver pockets for the rounded tops or bottoms of fin pack 62, and this serves to greatly improve the quality of bonding as compared to flat topped fin packs.

It should be appreciated that a heat exchanger manufactured as disclosed herein can have plates that are machined from stock material. Further, wire EDM and plunge EDM machining techniques can advantageously be used to rough profile the desired plate, and then add fine details such as turbulators. This construction method allows for short turn-around times in design, manufacture and testing. Further redesigns, when needed, are relatively easy. Furthermore, this method allows for weight savings by reducing the thickness of both the plates and the ribs, these dimensions are no longer limited to what can be done with traditional casting techniques.

The foregoing description is exemplary of the subject matter of the invention disclosed herein. Various non-limiting embodiments are disclosed, however, one of ordinary skill in the art would recognize that various modifications and variations in light of the above teachings will fall within the scope of the appended claims. It is therefore to be appreciated that within the scope of the appended claims, the disclosure may be practiced other than as specifically described. Thus, the scope of the present claims is not specifically limited by the details of specific embodiment disclosed herein, but rather the claims define the full and reasonable scope of the invention.

I claim:

1. A method for making a heat exchanger, the method comprising:

machining a plate of material having a starting thickness and at least one alignment feature, the machining comprising machining down the starting thickness to produce a heat exchanger plate having at least one flow passage segment, and at least two ribs arranged extending along each side of the at least one flow segment;

removing the at least one alignment feature to provide a trimmed heat exchanger plate;

stacking the trimmed heat exchanger plate with a further heat exchanger plate with the at least two ribs interlocked with ribs of the further heat exchanger plate, and the at least one flow segment aligned with a flow segment of the further heat exchanger plate; and joining the at least two ribs of the trimmed heat exchanger plate and the ribs of the further heat exchanger plate together, wherein the machining step produces the heat exchanger plate having the at least one flow passage segment and at least two ribs, and excess material extending in at least one dimension beyond the at least one flow passage segment and the at least two ribs to define the at least one alignment feature, the at least one dimension lying in a plane of the heat exchanger plate, and wherein the step of removing the at least one alignment feature comprises removing the excess material, wherein the machining step comprises machining the at least two ribs to have interlocking structure, wherein the interlocking structure is selected from the group consisting of a convex upward facing surface, a concave upward facing surface, or a combination of a convex upward facing surface and a concave upward facing surface, and further wherein the further heat exchanger plate has ribs that match the at least two ribs such that a convex surface is paired with a concave surface of the at least two ribs, and a concave surface is paired with a convex surface of the at least two ribs.

2. The method of claim 1, wherein the joining step comprises a diffusion bonding step.

3. The method of claim 2, further comprising applying braze to at least one of the at least two ribs of the trimmed heat exchanger plate and the ribs of the further heat exchanger plate.

4. The method of claim 1, wherein the machining comprises wire-EDM machining.

5. The method of claim 1, wherein the machining defines a plurality of machined flow passage segments extending along and defining a flow direction of the heat exchanger plate, wherein the at least two ribs comprise a plurality of ribs defined one on each side of each of the plurality of machined flow passage segments.

6. The method of claim 1, further comprising machining turbulator structures into a surface of the at least one flow passage segment.

7. The method of claim 6, wherein the step of further machining turbulator structures comprises plunge-EDM machining of the turbulator structures.

8. The method of claim 1, further comprising machining each side of the plate of material to produce a heat exchanger plate having the at least one flow passage segment and at least two ribs on each side of the heat exchanger plate.

9. The method of claim 1, wherein the at least one alignment feature comprises a hole passing through the excess material.

10. The method of claim 1, wherein the machining defines the heat exchanger plate having a thickness defined between opposed surfaces of the plate of between 0.005 and 0.020 inches.

11. The method of claim 1, wherein the machining defines the heat exchanger having the at least two ribs having a rib thickness of between 0.005 and 0.020 inches.

12. The method of claim 1, wherein the machining comprises machining both sides of a plurality of plates to produce a plurality of heat exchanger plates having the at least one flow passage segment and the at least two ribs on a first side, and having a second at least one flow passage segment and at least two ribs on a second side.

13. The method of claim 12, wherein the first at least one flow passage segment has different dimensions as compared to the second at least one flow passage segment.

14. The method of claim 13, wherein the stacking step comprises stacking the plurality of heat exchanger plates with the first side of one heat exchanger plate facing the first side of an adjacent heat exchanger plate, and with the second side of the one heat exchanger plate facing the second side of another adjacent heat exchanger plate.

15. The method of claim 14, wherein the at least one flow passage segment on the first side is perpendicular to the at least one flow passage on the second side.

* * * * *